(12) United States Patent
Kotecha (10) Patent No.: US 9,253,811 B2
(45) Date of Patent: Feb. 2, 2016

(54) NETWORK-ASSISTED DEVICE-TO-DEVICE COMMUNICATION

(71) Applicant: VERIZON PATENT AND LICENSING, INC., Basking Ridge, NJ (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 569 days.

(21) Appl. No.: 13/655,676

(22) Filed: Oct. 19, 2012

(65) Prior Publication Data

US 2014/0113556 A1    Apr. 24, 2014

(51) Int. Cl.
H04W 12/04    (2009.01)
H04W 76/02    (2009.01)

(52) U.S. Cl.
CPC .......... H04W 76/023 (2013.01); *H04W 12/04* (2013.01)

(58) Field of Classification Search
CPC ............................. H04W 12/00; H04W 76/023
See application file for complete search history.

(56) References Cited

U.S. PATENT DOCUMENTS

| | | | | |
|---|---|---|---|---|
| 7,362,722 | B2 * | 4/2008 | Otsuka ........................ | 370/328 |
| 2009/0059841 | A1 * | 3/2009 | Laroia et al. ................ | 370/328 |
| 2010/0202320 | A1 * | 8/2010 | Bennett ................ | H04W 84/18 |
| | | | | 370/254 |
| 2010/0214960 | A1 * | 8/2010 | Bahr et al. .................... | 370/255 |
| 2013/0150051 | A1 * | 6/2013 | Van Phan et al. ............ | 455/437 |

* cited by examiner

*Primary Examiner* — Lewis West (57) ABSTRACT

A device may receive, over a radio access network and from a first user device, an indication that the first user device and a second user device are to communicate, and may obtain session setup information for establishing a communication session, via a local network, between the first user device and the second user device. The device may determine, based on the session setup information, that the second user device is capable of participating in the communication session, and may transmit, over the radio access network and to the first user device and the second user device, session management information that permits the first user device and the second user device to establish the communication session via the local network.

20 Claims, 10 Drawing Sheets

| Device Identifier 510 | Connection Capability 520 | Security Capability 530 | Security Credentials 540 | Location 550 | Communication Range 560 |
|---|---|---|---|---|---|
| Device 1 | Wi-Fi | WPA | Network: MyWiFi Key: MyPassword | Lat1, Long1 | 30 meters |
| Device 1 | Bluetooth | PIN | 1234 | Triangulation Position 1 | 10 meters |
| Device 1 | Wi-Fi | WEP | Network: WiFi2 Key: Passkey | Lat2, Long2 | 20 meters |
| Device 2 | Wi-Fi | WPA-PSK | Network: MyWiFi Key: MyPassword | Lat3, Long3 | 30 meters |

NETWORK-ASSISTED DEVICE-TO-DEVICE COMMUNICATION

BACKGROUND

Radio access networks may become congested due to a large number of users sending and receiving large amounts of traffic. This congestion may reduce the quality of a user's experience.

DETAILED DESCRIPTION OF PREFERRED EMBODIMENTS

The following detailed description of example implementations refers to the accompanying drawings. The same reference numbers in different drawings may identify the same or similar elements.

Radio access networks may become congested due to a large number of users sending and receiving large amounts of traffic. This congestion may reduce the quality of a user's experience. The quality of a user's experience may be improved by decreasing the amount of traffic transmitted over the radio access network, which may be achieved by increasing the amount of traffic transmitted between devices over a local network (e.g., a personal area network, a local area network, etc.) that does not use resources of the radio access network (e.g. resources such as a base station, a packet data network gateway, a serving gateway, or other devices in a RAN).

Implementations described herein may decrease the amount of traffic transmitted over a radio access network (RAN) by assisting user devices, connected to the RAN, with the establishment and management of local network (e.g., non-RAN) communication sessions between the user devices.

Figure 1A:
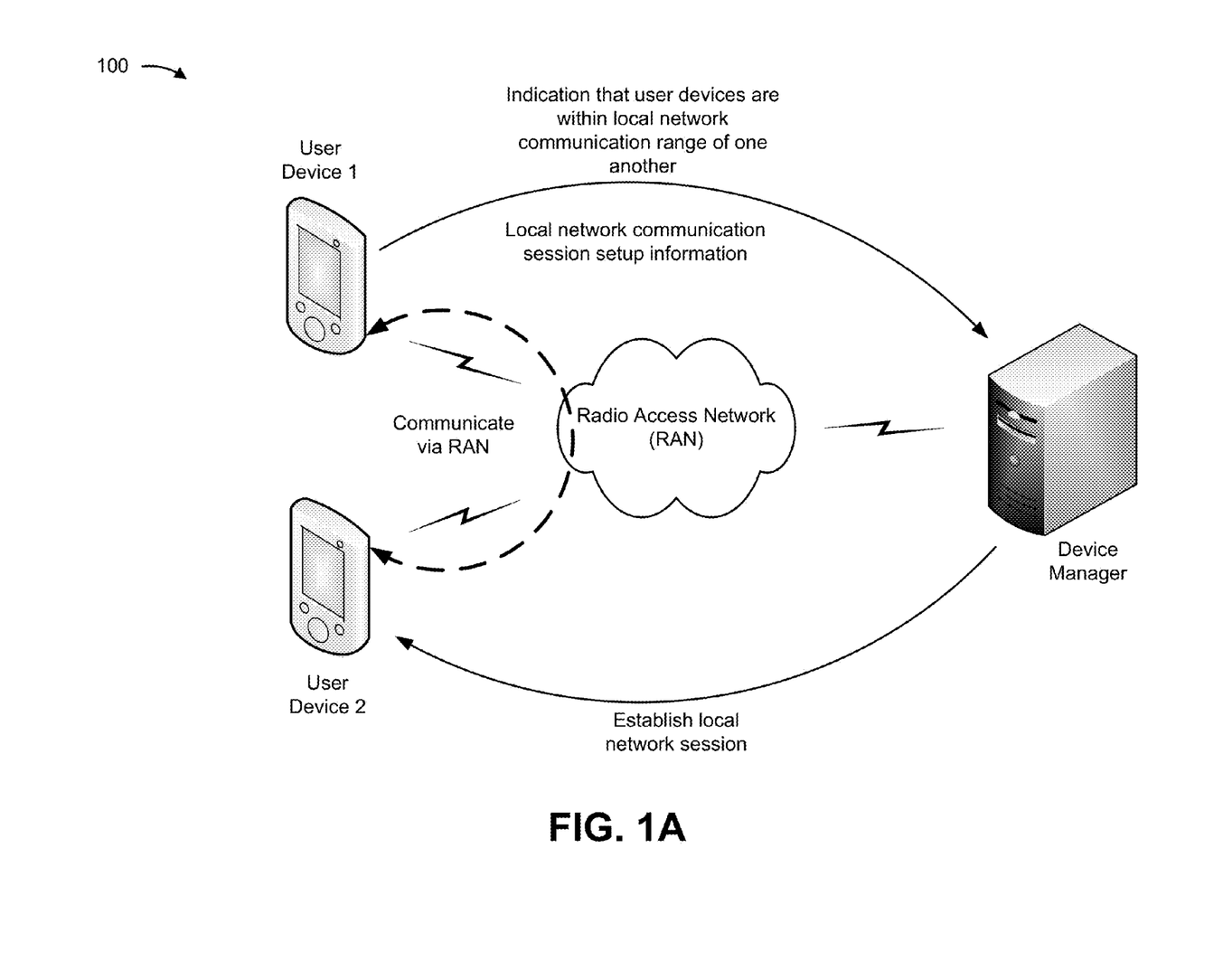
FIGS. 1A and 1B are diagrams of an overview of an example implementation described herein.
Figure 1B:
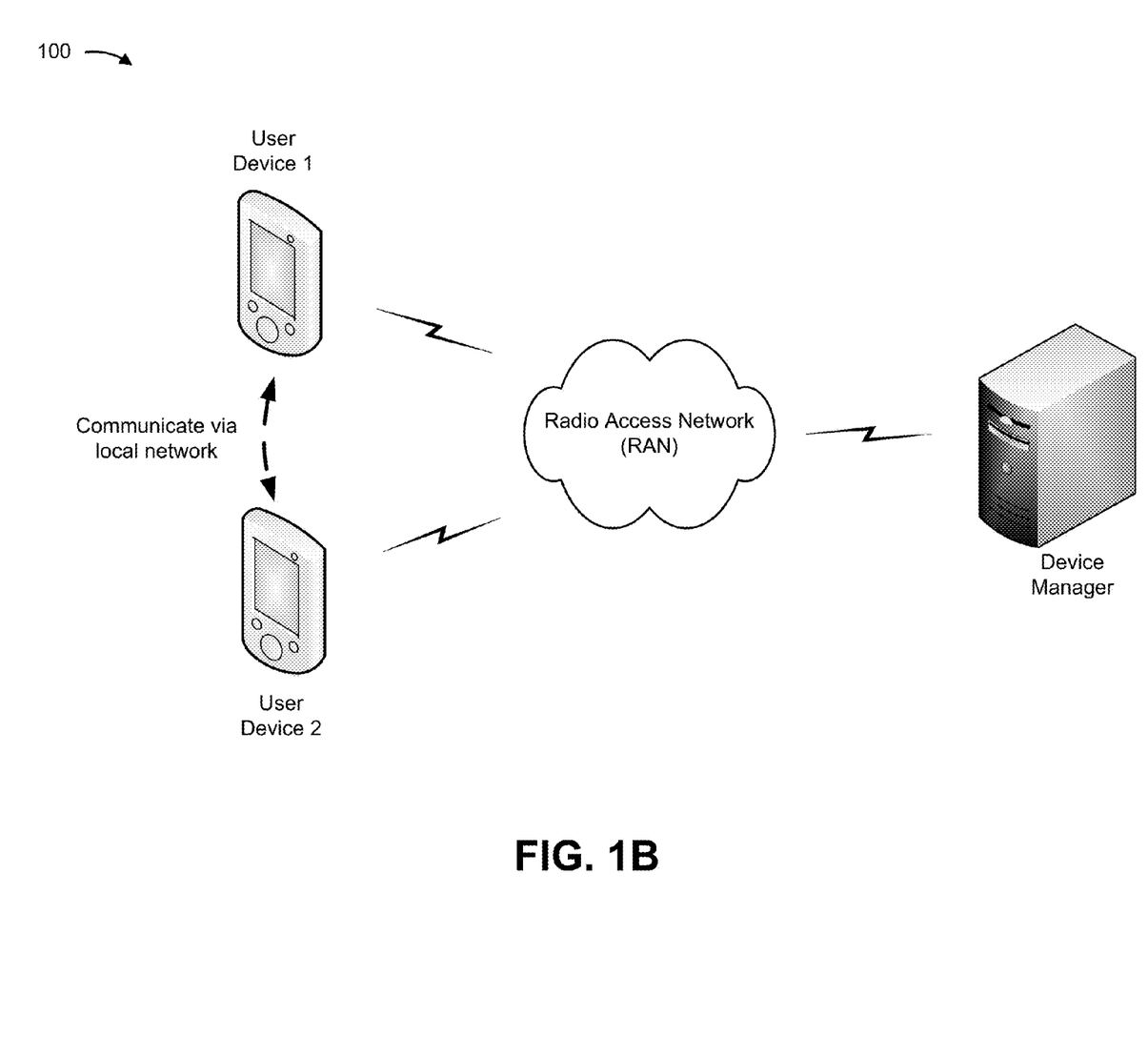

FIGS. 1A and 1B are diagrams of an overview of an example implementation 100 described herein. As shown in FIG. 1A, example implementation 100 may include a first user device, a second user device, a radio access network, and a device manager. In some implementations, the first and second user devices may be mobile phones, and the device manager may be a server computer.

As shown in FIG. 1A, the user devices may typically communicate via the RAN. However, the first user device may transmit an indication, to the device manager, that the user devices are within a local network communication range of one another. The first user device may also transmit, to the device manager, information that may assist the device manager in setting up a local network communication session between the user devices, such as a local network connection type (e.g., based on a connection protocol, such as WiFi, Bluetooth, etc.) and security credentials for the local network connection. The device manager may use the indication and the session setup information to establish and manage a local network session between the user devices. For example, the device manager may transmit a security key to the user devices, which may be used by the user devices to establish and manage a secure local network communication session. As shown in FIG. 1B, once the local network session has been set up, the user devices may communicate via the local network rather than via the RAN.

Figure 2:
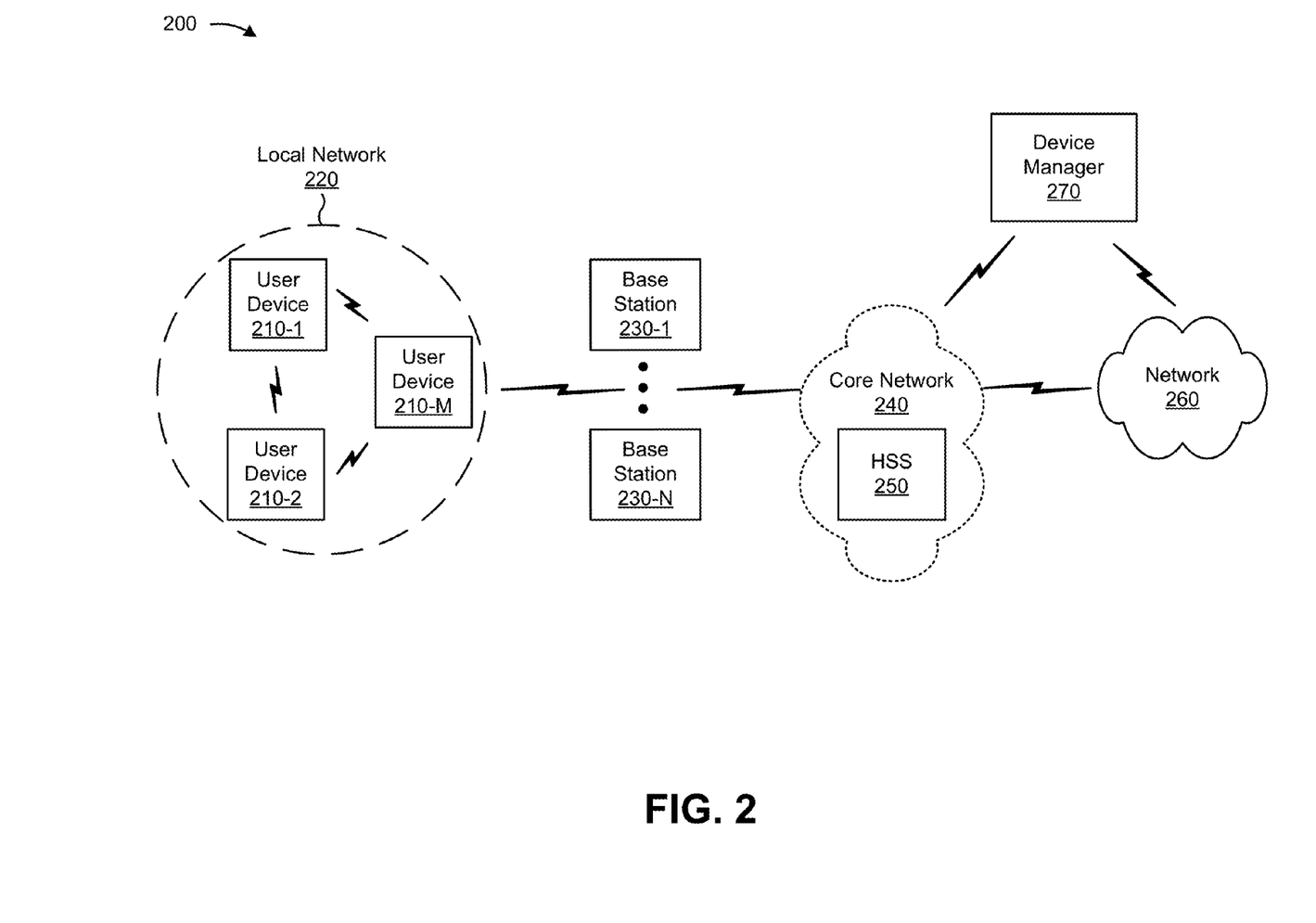
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210-1, 210-2, ..., 210-M (M≥1) (hereinafter referred to collectively as "user devices 210," and individually as "user device 210"), which may reside within and/or be capable of communicating via local network 220; one or more base stations 230-1 through 230-N (N≥1) (hereinafter referred to collectively as "base stations 230," and individually as "base station 230"); core network 240, which may include a home subscriber server ("HSS") 250; network 260; and device manager 270.

User device 210 may include a device, such as a wired and/or wireless communication device, that is capable of communicating with other devices (e.g., devices depicted in environment 200). For example, user device 210 may include a radiotelephone, a personal communications system ("PCS") terminal (e.g., that may combine a cellular radiotelephone with data processing and data communication capabilities), a personal digital assistant ("PDA") (e.g., that may include a radiotelephone, a pager, Internet/intranet access, etc.), a smart phone, a computer (e.g., a desktop computer, a laptop computer, a tablet computer, etc.), a set-top box, a television, a personal gaming system, a vending machine, an automatic teller machine (ATM), a parking meter, and/or another similar type of device.

Local network 220 may include one or more wired and/or wireless local networks. For example, local network 220 may include a local area network ("LAN"), a personal area network ("PAN") (e.g., a short-wavelength radio network, such as a Bluetooth network or another network based on frequency-hopping spread spectrum radio technology), a wireless local area network ("WLAN") (e.g., a Wi-Fi network or another network based on the Institute of Electrical and Electronics Engineers (IEEE) 802.11 standards, a WiMAX network or another network based on the IEEE 802.16 standards), an ultra-wideband network, or another type of network. Local network 220 may include a network other than a radio access network that provides communication with a core network (such as access, via base station 230, to core network 240).

Base station 230 may include one or more devices that receive, process, and/or transmit traffic, such as media, audio, video, text, and/or other traffic, destined for and/or received from user device 210. In some implementations, base station 230 may be include an evolved node B (eNB) associated with a long term evolution ("LTE") network that receives traffic from and/or sends traffic to network 260 via a packet data network gateway and/or a serving gateway (e.g., residing in core network 240). Additionally, or alternatively, one or more base stations 230 may be associated with a RAN that is not associated with the LTE network. Base station 230 may send traffic to and/or receive traffic from user device 210 via an air interface.

Core network 240 may include one or more wired and/or wireless networks. In some implementations, core network 240 may include an evolved packet system ("EPS") that includes an LTE network (e.g., including base stations 230) and/or an evolved packet core ("EPC") that operates based on a third generation partnership project ("3GPP") wireless communication standard. The LTE network may be a radio access network that includes base stations 230 that take the form of evolved Node Bs ("eNBs") via which user devices 210 communicate with core network 240. Core network 240 may include HSS 250, a mobility management entity device, a packet data network gateway, a serving gateway, an authentication, authorization, and accounting server, a call session control function server, a policy charging and rules function server, and/or other devices that enable user devices 210 to communicate with network 260 and/or other devices. In some implementations, core network 240 may include devices that perform functions of an Internet protocol ("IP") multimedia subsystem ("IMS") core.

Network 260 may include one or more wired and/or wireless networks. For example, network 260 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 260 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Device manager 270 may include one or more server devices, or other types of devices, that gather, process, search, store, and/or provide information in a manner described herein. In some implementations, device manager 270 may receive information, from user device 210, that assists in the establishment and/or management of a local network communication session, via local network 220, between user devices 210. Additionally, or alternatively, device manager 270 may transmit information, to user devices 210, that assists in the establishment and/or management of a local network communication session, via local network 220, between user devices 210. While shown as separate from core network 240, device manager 270 may be integrated into (and a part of) core network 240 in some implementations.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
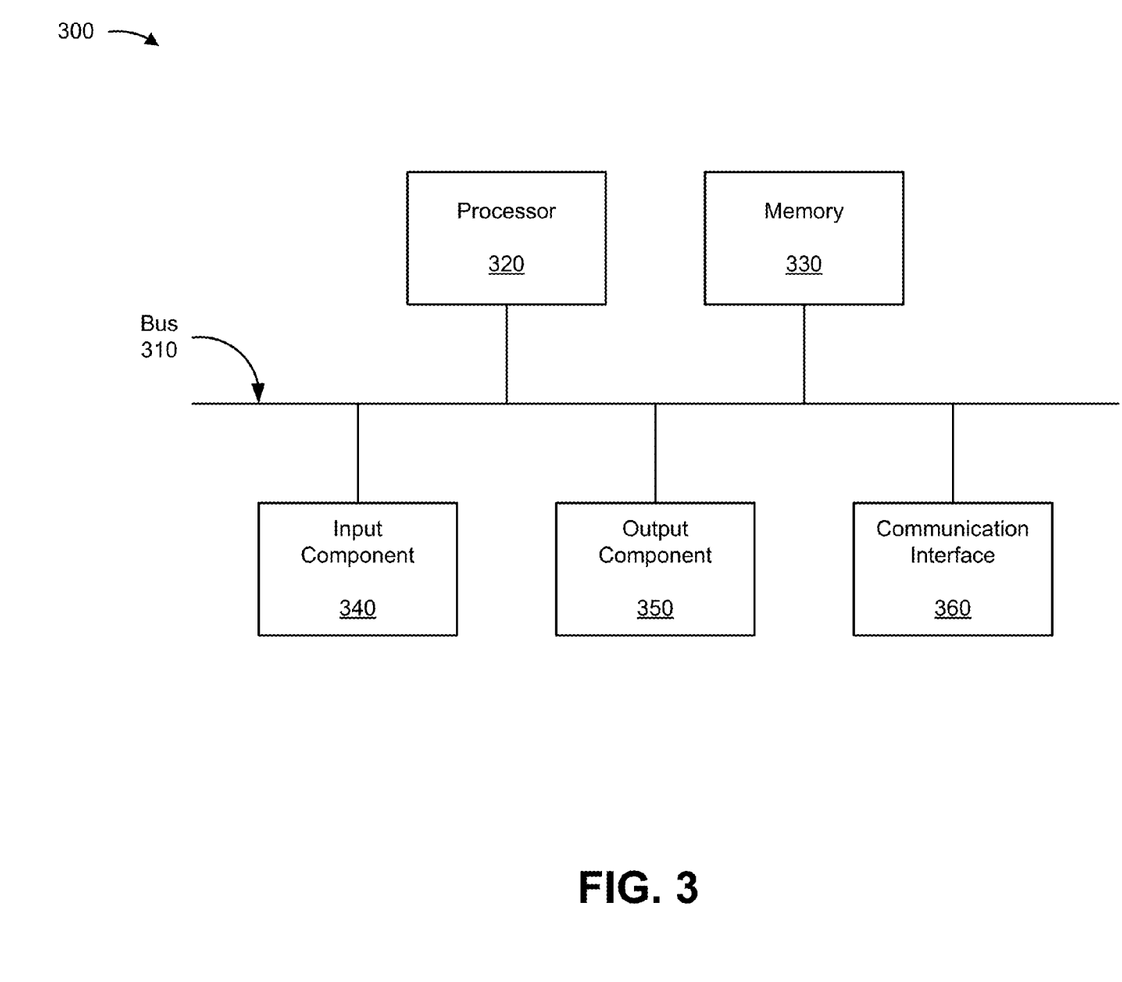
FIG. 3 is a diagram of example components of one or more devices of FIG. 2.

FIG. 3 is a diagram of example components of a device 300. Device 300 may correspond to user device 210, base station 230, HSS 250, and/or device manager 270. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210, base station 230, HSS 250, and/or device manager 270 may include one or more devices 300 and/or one or more components of device 300.

Figure 4:
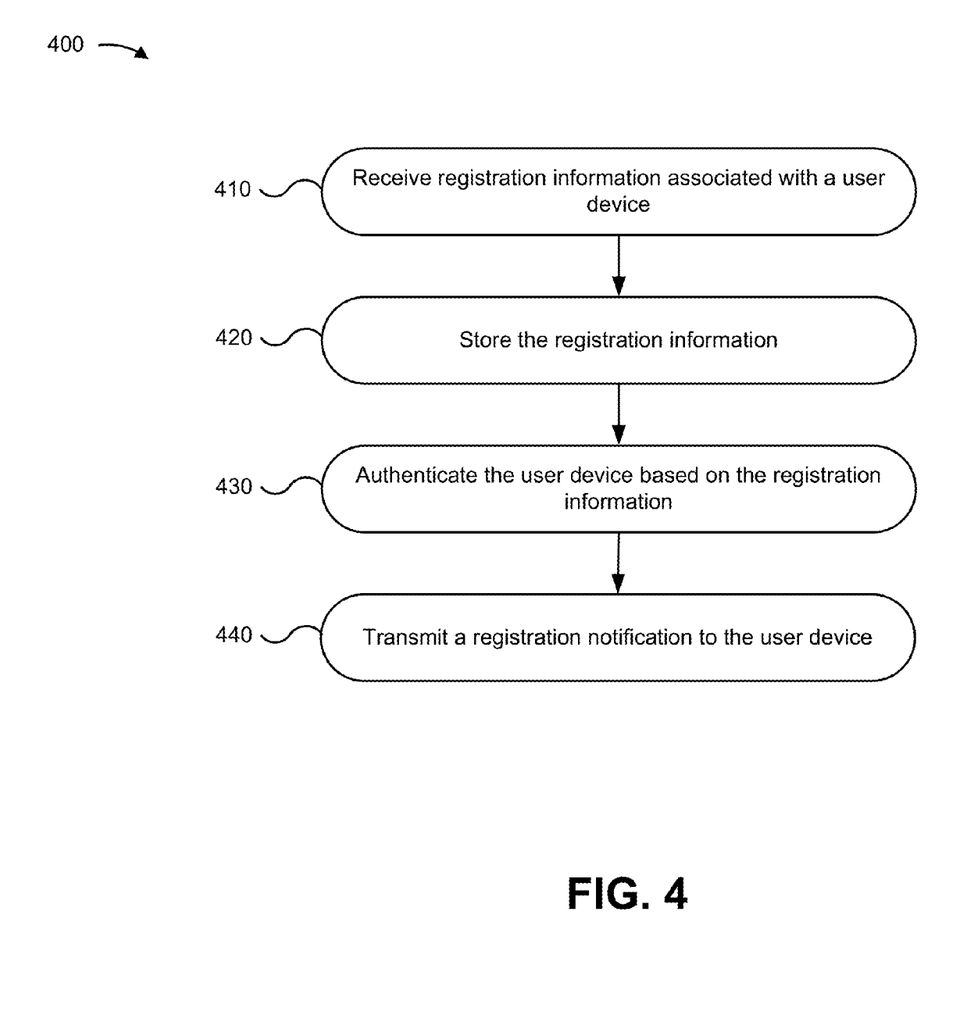
FIG. 4 is a flow chart of an example process for registering a user device for a local network communication session.

FIG. 4 is a flow chart of an example process 400 for registering a user device for a local network communication session. In some implementations, one or more process blocks of FIG. 4 may be performed by device manager 270. Additionally, or alternatively, one or more process blocks of FIG. 4 may be performed by another device or a group of devices separate from or including device manager 270.

As shown in FIG. 4, process 400 may include receiving registration information associated with a user device (block 410). In some implementations, device manager 270 may receive the registration information from user device 210 and/or base station 230. A user of user device 210 may initiate transmission of the registration information to device manager 270 (e.g., by requesting, using a user interface of user device 210, that the registration information be transmitted to device manager 270). Additionally, or alternatively, the registration information may be periodically transmitted to device manager 270 (e.g., once per minute, once per hour, once per day, etc.). In some implementations, the registration information may be transmitted to device manager 270 based on an event, such as user device 210 entering a service area served by base station 230, user device 210 entering an area within a communication range of another user device 210, or the like.

The registration information may include information that assists in establishing and managing a local network communication session between user devices 210. For example, the registration information may identify a user device 210 (e.g., via a device identifier), a local network connection type that user device 210 is capable of using (e.g., based on a connection protocol, such as Wi-Fi, Bluetooth, ultra-wideband, WiMAX, etc.), a type of security protocol that user device 210 is capable of using (e.g., a wired equivalent privacy (WEP) security protocol, a Wi-Fi protected access (WPA or WPA2) security protocol, a pre-shared key (PSK) security protocol, a personal identification number (PIN), etc.), security credentials for accessing local network 220 via user device 210 (e.g., a username and password, a PIN, etc.), a location of user device 210 and/or local network 220 (e.g., a geographic location, such as a global positioning system (GPS) position, a position determined using triangulation, etc.), a bandwidth and/or quality of service level that user device 210 is capable of providing, information stored by user device 210 that is accessible by other user devices 210 (e.g., an indication of shared folders, public folders, private folders, etc.; an indication of protected files, such as files protected via digital rights management (DRM) security protocols; etc.), etc.

In some implementations, the registration information may include a communication range of local network 220, accessible by user device 210. The communication range may depend on the local network connection type (e.g., a Bluetooth network may have a different communication range than a Wi-Fi network, etc.). In some implementations, the communication range may refer to a distance between user devices 210. Additionally, or alternatively, the communication range may refer to a distance between a user device 210 and a device that provides access to local network 220 (e.g., a router, a hub, a gateway, etc.). User devices 210 located within the communication range of local network 220 are capable of communicating using local network 220 (e.g., assuming that user devices 210 have the appropriate security credentials, connection capabilities, etc.).

Returning to FIG. 4, process 400 may include storing the registration information (block 420). In some implementations, device manager 270 may store the registration information in memory. For example, device manager 270 may store the registration information in a data structure, as discussed below in connection with FIG. 5.

Process 400 may include authenticating the user device based on the registration information (block 430). In some implementations, device manager 270 may use the registration information (e.g., a device identifier, such as an international mobile subscriber identify (IMSI), or the like) to authenticate user device 210. For example, device manager 270 may authenticate user device 210 by transmitting registration information to HSS 250, and receiving an indication that user device 210 is a valid user device (e.g., that user device 210 is registered with the RAN). Additionally, or alternatively, device manager 270 may authenticate user device 210 using a generic bootstrapping architecture (GBA) or another manner.

Process 400 may also include transmitting a registration notification to the user device (block 440). In some implementations, device manager 270 may transmit a registration notification, to user device 210, that indicates that user device 210 is discoverable by and/or able to discover other user devices 210 that are within a communication range of user device 210 and/or that have been registered and/or authenticated (e.g. via device manager 270, HSS 250, a GBA, etc.). In some implementations, the registration notification may include an indication that a particular contact (e.g., a contact displayed on a user interface of user device 210) is within communication range of user device 210. A user may select the contact to initiate a local network communication session with a user device 210 of the contact.

While a series of blocks has been described with regard to FIG. 4, the blocks and/or the order of the blocks may be modified in some implementations. Additionally, or alternatively, non-dependent blocks may be performed in parallel.

Figure 5:
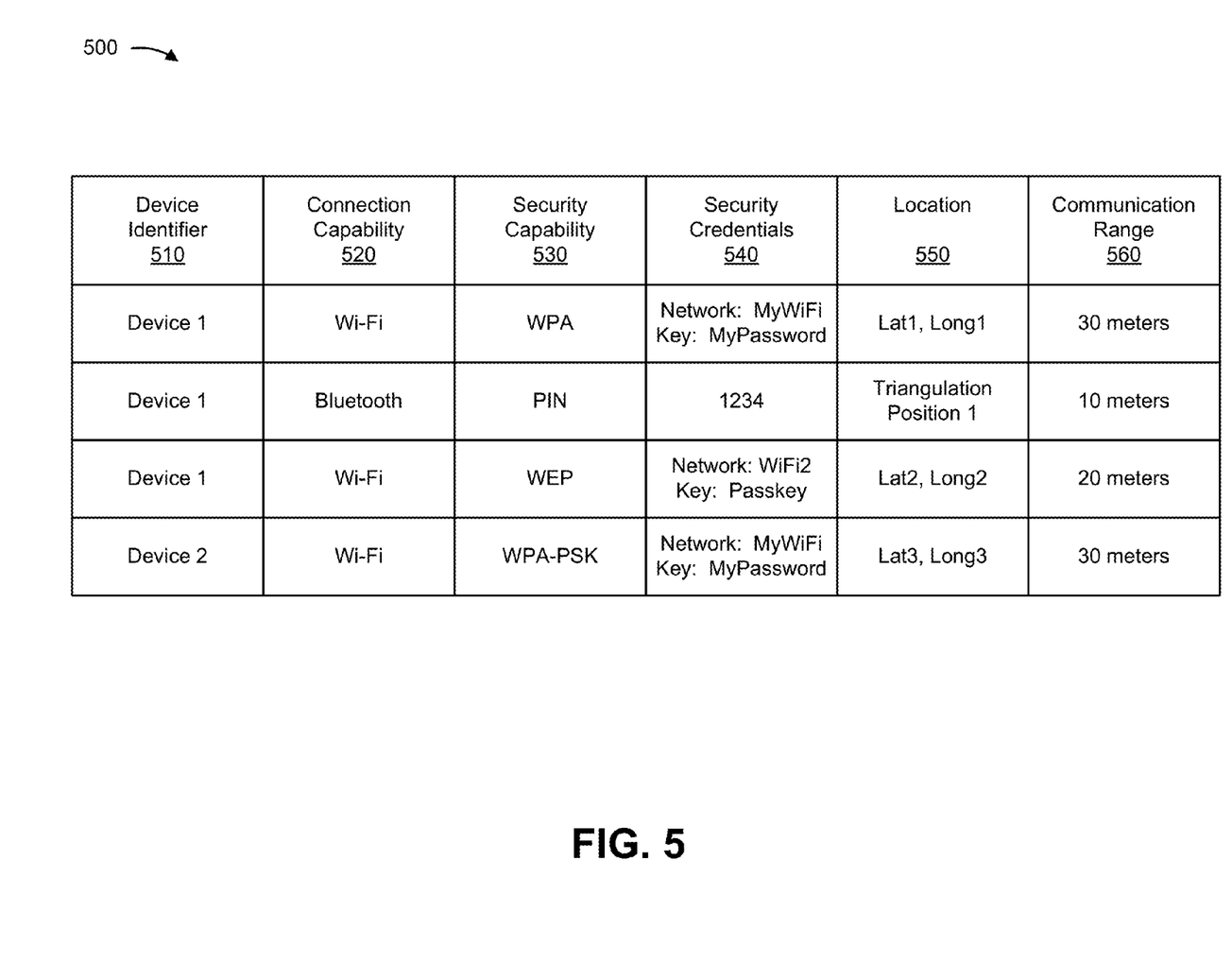
FIG. 5 is a diagram of an example data structure that stores registration information.

FIG. 5 is a diagram of an example data structure 500 that stores registration information. Data structure 500 may be stored in a memory device (e.g., a RAM, a hard disk, etc.), associated with one or more devices shown in FIG. 2. For example, data structure 500 may be stored by device manager 270. Additionally, or alternatively, data structure 500 may be stored by user device 210, base station 230, HSS 250, and/or another device.

Data structure 500 may include a collection of fields, such as a device identifier field 510, a connection capability field 520, a security capability field 530, a security credentials field 540, a location field 550, and a communication range field 560.

Device identifier field 510 may store information that identifies a user device 210. For example, device identifier field 510 may identify user device 210 using a device identifier (e.g., a mobile equipment identifier (MEID), a mobile dialing/directory number (MDN), an international mobile subscriber identity (IMSI), a mobile station international subscriber directory number (MSISDN), a service programming code (SPC), etc.), a user identifier associated with user device 210 (e.g., a user account, a user name, etc.), or the like.

Connection capability field 520 may store information that identifies a local network connection type via which user device 210, identified by device identifier field 510, is capable of communicating. For example, connection capability field 520 may identify a connection capability by a connection protocol (e.g., Wi-Fi, Bluetooth, ultra-wideband, WiMAX, etc.). The connection protocol may be a connection protocol of local network 220 accessible by user device 210.

Security capability field 530 may store information that identifies a security protocol that user device 210, identified by device identifier field 510, is capable of using to protect communications made using the connection type identified by connection capability field 520. For example, security capability field 530 may identify a security protocol, such as a WEP security protocol, a WPA security protocol, a WPA2 security protocol, a pre-shared key (PSK) security protocol, a personal identification number (PIN), or the like. In some implementations, the security protocol may be a combination of different security protocols (e.g., WPA-PSK). The security protocol may protect (e.g., encrypt and/or decrypt) communications made by user device 210 over local network 220.

Security credentials field 540 may store information that identifies security credentials that may be used by user device 210, identified by device identifier field 510, to access local network 220. Local network 220 may be a local network of a type identified by connection capability field 520, and protected by a security protocol identified by security capability field 530. For example, security credentials field 540 may identify a local network 220 (e.g., using a user-specified and/or device-specified network name), and/or may identify a password (e.g., a PIN, a security key, etc.) used to access local network 220.

Location field 550 may store information that identifies a location of user device 210 identified by device identifier field 510. Additionally, or alternatively, location field 550 may store information that identifies a location of local network 220 identified by fields 520, 530, and/or 540. For example, location field 550 may identify a GPS position and/or a triangulation position (e.g., determined using cellular base station triangulation) of user device 210 and/or local network 220 (e.g. a device that provides access to local network 220).

Communication range field 560 may store information that identifies a communication range of local network 220 identified by fields 520, 530, and/or 540. For example, communication range field 560 may identify a communication range of local network 220 based on a connection type of local network 220. The communication range may identify a maximum communication range; an average communication range; a communication range associated with a particular signal strength, bandwidth, quality of service level, transfer speed, etc.; or the like.

Registration information associated with a user device 210 may be conceptually represented as a row in data structure 500. For example, the first row in data structure 500 may correspond to a user device identified as "Device 1," which may be capable of communicating using a "Wi-Fi" local network with "WPA" security. Device 1 may be capable of accessing a Wi-Fi network identified as "MyWiFi" using a password key of "MyPassword." Device 1 and/or the "Wi-Fi" network (e.g., a device that provides the "Wi-Fi" network) may be located at a position identified as "Lat1, Long1," and the "Wi-Fi" network may have a communication range of "30 meters."

The number of fields illustrated in FIG. 5 is provided for explanatory purposes. In practice, data structure 500 may include additional fields, fewer fields, different fields, or differently arranged fields than those illustrated in FIG. 5. Furthermore, while data structure 500 is represented as a table with rows and columns, in practice, data structure 500 may include any type of data structure, such as a linked list, a tree, a hash table, or another type of data structure. In some implementations, data structure 500 may include information generated by a device and/or a component. Additionally, or alternatively, data structure 500 may include information provided from another source, such as information provided by a user, and/or information automatically provided by a device.

Figure 6:
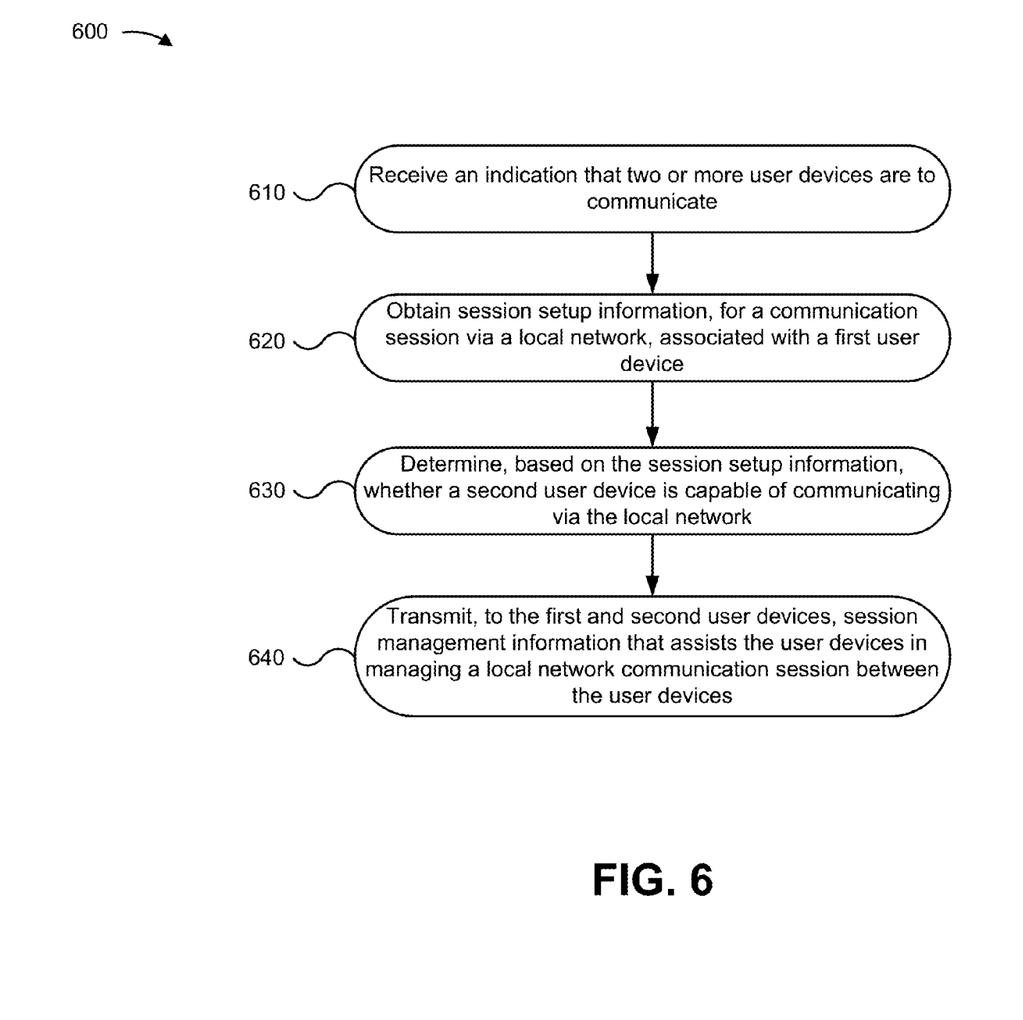
FIG. 6 is a flow chart of an example process for establishing a local network communication session.

FIG. 6 is a flow chart of an example process 600 for establishing a local network communication session. In some implementations, one or more process blocks of FIG. 6 may be performed by device manager 270. Additionally, or alternatively, one or more process blocks of FIG. 6 may be performed by another device or a group of devices separate from or including device manager 270.

As shown in FIG. 6, process 600 may include receiving an indication that two or more user devices are to communicate (block 610). In some implementations, device manager 270 may receive an indication that two or more user devices 210 are within communication range of one another. For example, device manager 270 may receive information identifying a location (e.g., a GPS position) of user devices 210. Device manager 270 may determine that the locations of user devices 210 are within a communication range of local network 220 (e.g., user devices 210 are within a particular distance of one another or within a particular distance of a device that provides access to local network 220). Additionally, or alternatively, user device 210 may determine that user device 210 is within a local network communication range of another user device 210, and may transmit the indication to device manager 270. Additionally, or alternatively, a device that provides access to local network 220 may determine that two or more user devices 210 are within communication range of local network 220, and may transmit the indication to device manager 270.

In some implementations, device manager 270 may receive an indication that two or more user devices 210 are to share information. For example, a user of a first user device 210 may indicate a desire to share and/or transfer information (e.g., a media file) to a second user device 210, and device manager 270 may receive the indication. The user may select a contact (e.g., via a user interface of user device 210) to initiate a local network communication session with a user device 210 of the contact. In some implementations, that contact may be displayed on user device 210 with an indication that the contact is accessible via local network 220.

As further shown in FIG. 6, process 600 may include obtaining session setup information, for a communication session via a local network, associated with a first user device (block 620). For example, device manager 270 may request the session setup information for the first user device 210 based on receiving the indication that the two or more user devices 210 are to communicate via local network 220, and may receive the session setup information (e.g., from the first user device 210, from data structure 500 stored by device manager 270, from base station 230, and/or from another device). Additionally, or alternatively, device manager 270 may receive session setup information along with the indication (e.g., without requesting the session setup information). In some implementations, a user may specify, via a user interface of the first user device 210, requirements for establishing a local network communication session with a second user device 210. Additionally, or alternatively, the requirements may be based on the registration information (e.g., capabilities of user device 210), and may be stored by device manager 270 (e.g., via data structure 500, FIG. 5).

The session setup information may include information that assists in establishing and/or managing a local network connection (e.g., a peer-to-peer connection) between user devices 210. For example, session setup information may identify a connection capability of user device 210, a security capability of user device 210, a location of user device 210, information stored by user device 210 that is available to share with another user device 210, a bandwidth and/or quality of service level required for a particular communication session (e.g., sharing a media file), a permission level of user device 210 (e.g., a level of access to another user device 210, such as read access, write access, access to particular files/information, etc.), or the like.

As further shown in FIG. 6, process 600 may include determining, based on the session setup information, whether a second user device is capable of communicating via the local network (block 630). In some implementations, device manager 270 may compare capabilities of the second user device 210 to requirements received with the session setup information (e.g., which may be identified by the registration information stored in data structure 500, FIG. 5). For example, device manager 270 may determine that the second user device 210 is capable of communicating using a particular connection type, that the second user device 210 is capable of communicating using a particular security protocol, that the second user device 210 is within a communication range of the first user device 210, that the second user device 210 has permission to access particular information stored by the first user device 210 (and/or that the first user device 210 has permission to access particular information stored by the second user device 210), that the second user device 210 is capable of transferring information at a particular bandwidth and/or is capable of providing a particular quality of service level, or the like.

In some implementations, device manager 270 may determine capabilities that the first and second user devices 210 have in common. For example, device manager 270 may receive an indication that user devices 210 are to communicate via a local network, and may identify a connection capability, a security capability, a bandwidth capability, etc., that user devices 210 have in common. Device manager 270 may assist in establishing a local network communication session based on the identified capabilities. In some implementations, device manager 270 may automatically set up the best available communication session (e.g., the most secure, the one that offers the highest bandwidth, etc.). Additionally, or alternatively, device manager 270 may display (e.g., via user device 210) available capabilities to a user, and may set up a communication session based on a user selection of an available capability. Additionally, or alternatively, device manager 270 may display (e.g., via user device 210) a notification that user devices 210 are not in range, and may provide directions (e.g., a distance and/or navigation directions) that enable a user of user device 210 to get within communication range of another user device 210.

As further shown in FIG. 6, process 600 may include transmitting, to the first and/or second user devices, session management information that assists the user devices in managing a local network communication session between the user devices (block 640). In some implementations, device manager 270 may transmit the session management information to the first user device 210 and/or the second user device 210.

The session management information may identify a local network 220 via which user devices 210 are to communicate, a security protocol to be used for the communication session, a security key to be used for the session, a bandwidth at which information is to be transmitted during the communication session, files and/or information accessible by user devices 210 during the session, a quality of service level for the session, or the like. User devices 210 may establish and/or manage a communication session using the session management information.

In some implementations, device manager 270 may provide a security key to user devices 210. The security key may enable access to particular information, at a particular bandwidth or quality of service level, for a particular duration of time (e.g., an amount of time, such as a minute, an hour, etc.; and/or a duration of time based on the length of the communication session or the transfer of particular information). In some implementations, the security key may be provided via generic bootstrapping architecture authentication.

While a series of blocks has been described with regard to FIG. 6, the blocks and/or the order of the blocks may be modified in some implementations. Additionally, or alternatively, non-dependent blocks may be performed in parallel.

Figure 7A:
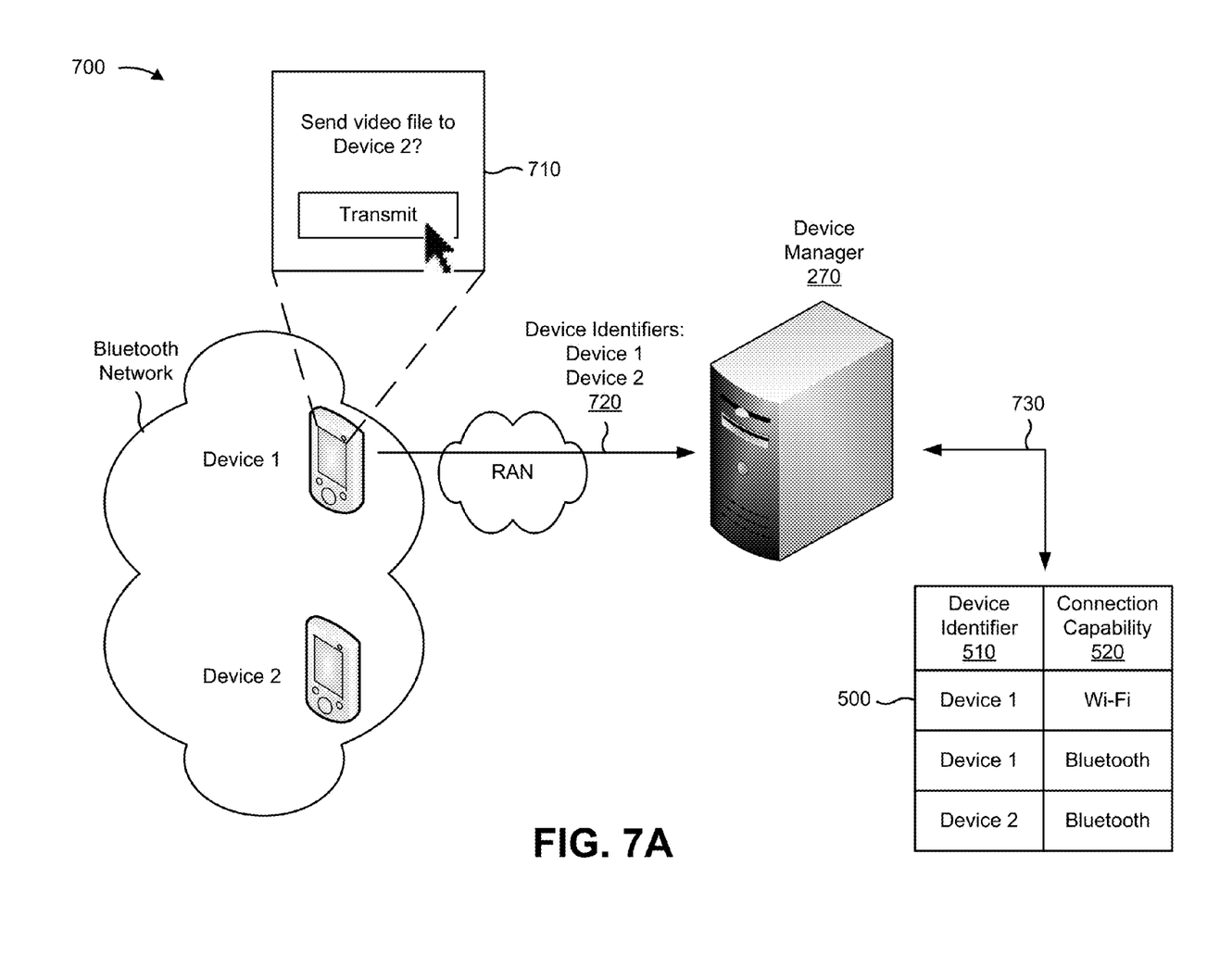
FIGS. 7A-7C are diagrams of an example implementation relating to the process shown in FIG. 6.
Figure 7B:
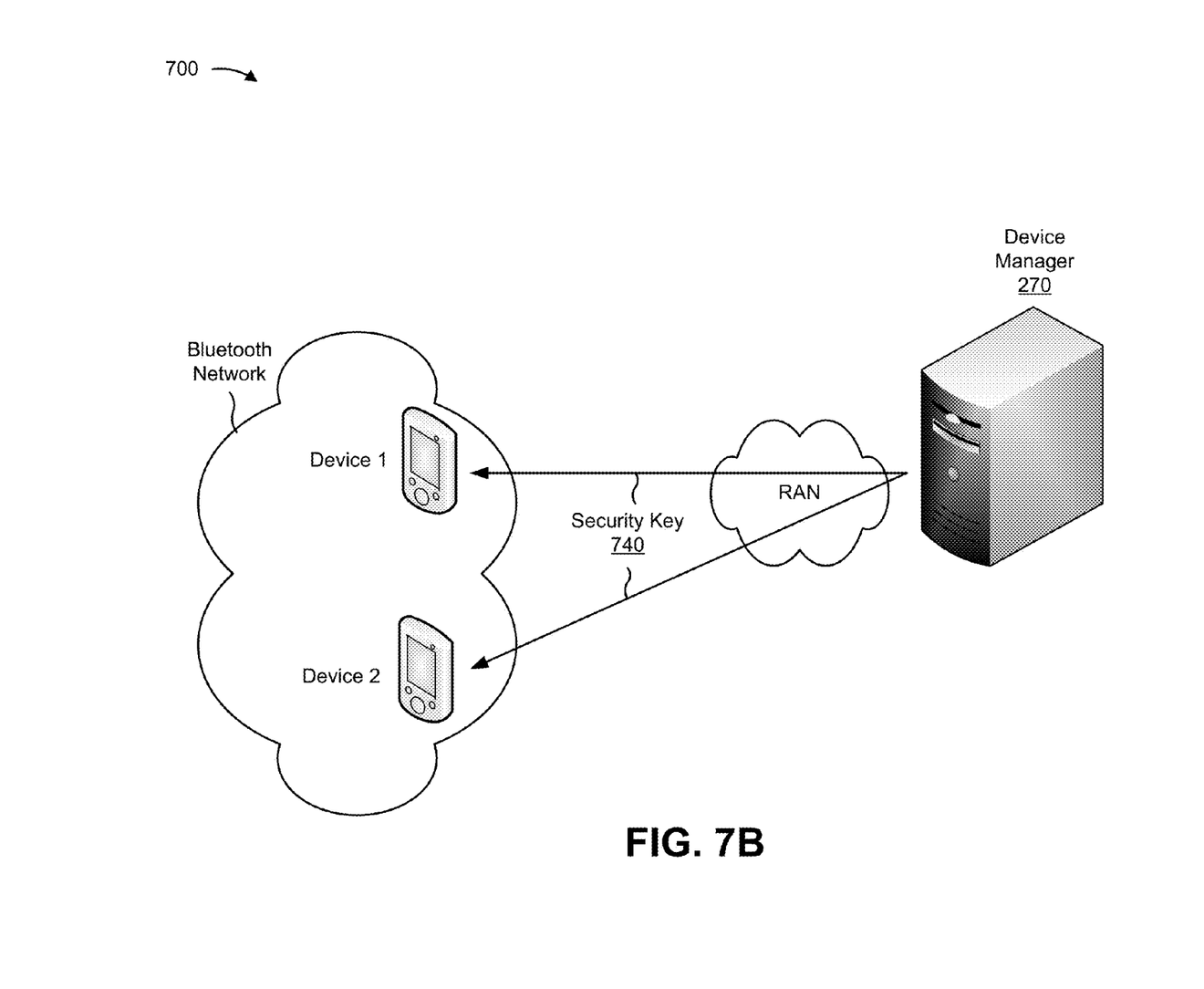
Figure 7C:
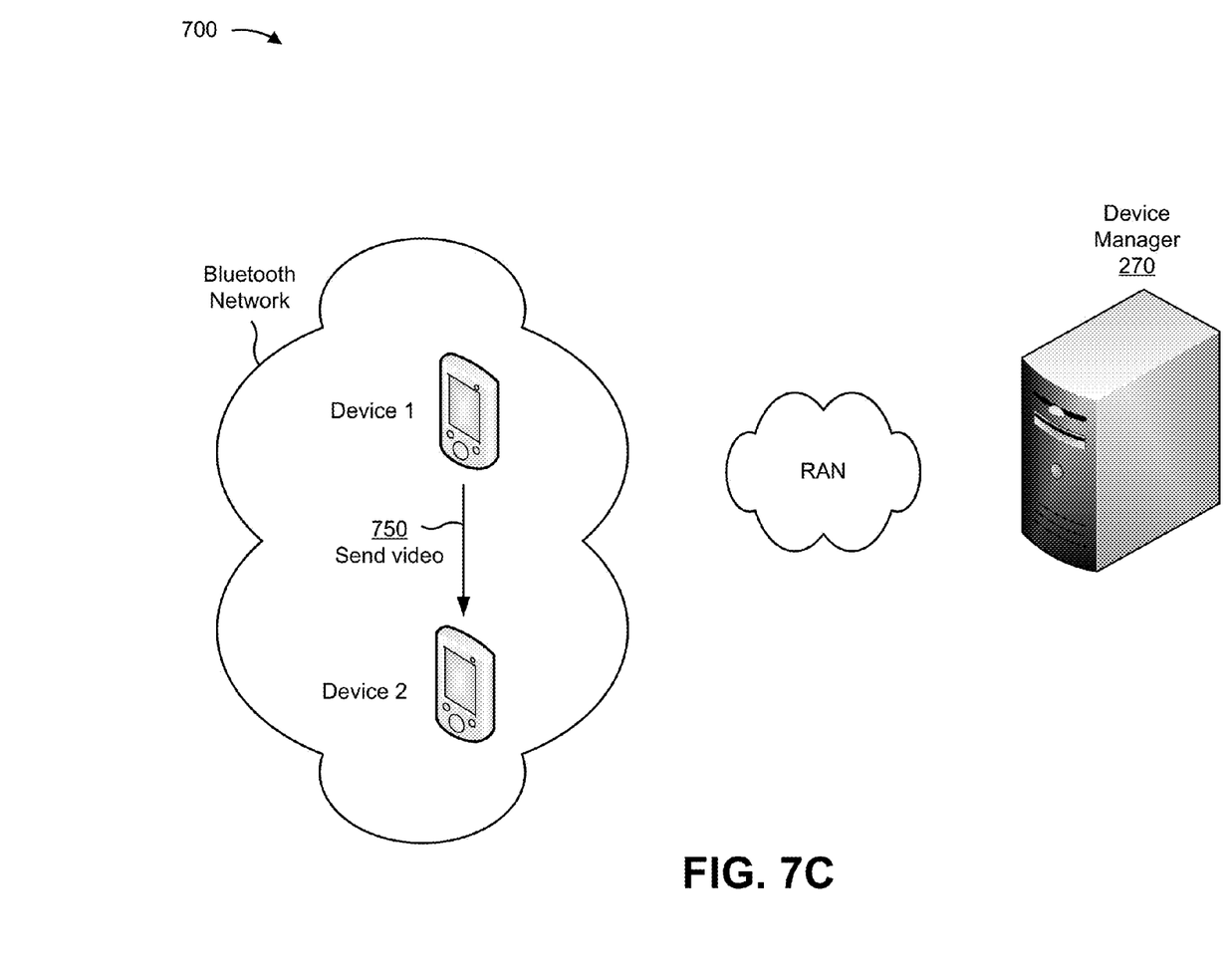

FIGS. 7A-7C are diagrams of an example implementation 700 relating to the process shown in FIG. 6. FIGS. 7A-7C show an example implementation 700 where device manager 270 assists in establishing a Bluetooth network communication session between two user devices.

As shown by reference number 710 of FIG. 7A, a user of a first user device ("Device 1") may indicate a desire to transmit information, such as a video file, to a second user device ("Device 2"). For example, the user may interact with a user interface of Device 1 to select a file to transmit to Device 2. In some implementations, device manager 270 may notify Device 1 that Device 2 is within communication range of the Bluetooth network and capable of communicating via the Bluetooth network, and may receive a request from a user of Device 1 to transfer the file via the Bluetooth network.

As shown by reference number 720, Device 1 may transmit, to device manager 270 via a RAN, information that identifies Device 1 and Device 2 (e.g., a device identifier, a phone number, etc.). As shown by reference number 730, device manager 270 may obtain session setup information (e.g., communication session requirements and/or device capabilities) from data structure 500. For example, device manager 270 may determine that Device 1 and Device 2 are both capable of communicating via a Bluetooth network. For example, device manager 270 may determine that Device 1 and Device 2 both have Bluetooth capabilities and are both within a communication range required for Bluetooth communications. In those situations where Device 1 and Device 2 are not within the required communication range, device manager 270 may notify Device 1 and/or Device 2 that they are not within range, and may provide directions to Device 1 and/or Device 2 for getting to a location that is within the required communication range.

In some implementations, device manager 270 may determine whether Device 1 and Device 2 are capable of communicating using a requested security protocol, are capable of transmitting and/or receiving requested information at a requested bandwidth and/or quality of service level, etc. Additionally, or alternatively, device manager 270 may determine whether Device 1 and Device 2 have permission to access one another and/or the requested information (e.g., the video file).

As shown by reference number 740 of FIG. 7B, device manager 270 may transmit, via the RAN, a security key to Device 1 and Device 2 that assists in establishing a Bluetooth network communication session. The security key may identify a duration for the communication session, a data rate at which the video file is to be transmitted, security information for accessing the Bluetooth network, a security protocol to protect information transmitted via the Bluetooth communication session, etc.

As shown by reference number 750 of FIG. 7C, Device 1 and Device 2 may use the security key provided by device manager 270 to establish a Bluetooth network communication session, and Device 1 may transmit the video file to Device 2 via the Bluetooth network communication session (e.g., and not via the RAN).

Implementations described herein may decrease the amount of traffic transmitted over a radio access network (RAN) by assisting user devices, connected to the RAN, with the establishment and management of local network (e.g., non-RAN) communication sessions between the user devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
    one or more processors to:
        receive, over a radio access network and from a first user device, an indication that the first user device and a second user device are to communicate;
        obtain session setup information for establishing a communication session, via a local network, between the first user device and the second user device,
            the session setup information identifying a security protocol for the communication session;
        determine, based on the session setup information, that the second user device is capable of communicating, via the local network, using the security protocol;
        determine that the second user device is capable of participating in the communication session with the first user device via the local network based on determining that the second user device is capable of communicating, via the local network, using the security protocol; and
        transmit, over the radio access network and to the first user device and the second user device, session management information that permits the first user device and the second user device to establish the communication session via the local network.

2. The device of claim 1, where the session setup information further identifies at least one of:
    a required distance between the first user device and the second user device;
    a required communication range for the communication session;
    a required bandwidth for the communication session; or
    a required quality of service level for the communication session.

3. The device of claim 1, where the session management information identifies a security key that permits the first user device and the second user device to establish the communication session via the local network.

4. The device of claim 3, where the security key identifies at least one of:
    a duration for the communication session;
    a data rate at which information is to be transmitted between the first user device and the second user device; or
    the security protocol for the communication session.

5. The device of claim 1, where the one or more processors, when determining that the second user device is capable of participating in the communication session, are to:
    determine that the first user device is within a particular communication range of the second user device,
        the particular communication range being based on a type of the local network, and
    determine that the second user device is capable of participating in the communication session with the first user device via the local network based on determining that the second user device is capable of communicating, via the local network type, using the security protocol and based on determining that the first user device is within the particular communication range of the second user device.

6. The device of claim 1, where the session setup information further identifies a local network type of the local network.

7. The device of claim 1, where the local network is different from the radio access network.

8. A method, comprising:
    receiving, by a device and via a base station, an indication that a first user device and a second user device are to establish a communication session;
    obtaining, by the device, session setup information for establishing the communication session,
        the session setup information identifying a local network and a security protocol for the communication session, and
        the based station being outside of the local network does not include the base station;
    determining, by the device and based on the session setup information, that the second user device is capable of communicating, via the local network, using the security protocol;
    determining, by the device, that the second user device is capable of participating in the communication session with the first user device via the local network based on determining that the second user device is capable of communicating, via the local network, using the security protocol; and
    transmitting, by the device and to the first and second user devices via the base station, session management information that permits the first user device and the second user device to establish the communication session.

9. The method of claim 8, where the indication comprises an indication that information is to be transferred between the first user device and the second user device.

10. The method of claim 8, where the session setup information further identifies at least one of:
    a distance between the first user device and the second user device;
    a communication range for the communication session;
    a bandwidth for the communication session; or
    a quality of service level for the communication session.

11. The method of claim 8, where the session management information identifies a security key that permits the first user device and the second user device to establish the communication session.

12. The method of claim 11, where the security key identifies at least one of:
   a duration for the communication session;
   a data rate for the communication session; or
   the security protocol for the communication session.

13. The method of claim 8, where determining that the second user device is capable of participating in the communication session comprises:
   determining that the first user device is within a particular communication range of the second user device,
      the particular communication range being based on a type of the local network, and
   determining that the second user device is capable of participating in the communication session with the first user device via the local network based on determining that the second user device is capable of communicating, via the local network type, using the security protocol and based on determining that the first user device is within the particular communication range of the second user device.

14. The method of claim 8, where the session setup information identifies a local network type of the local network.

15. A non-transitory computer-readable medium storing instructions, the instructions comprising:
   one or more instructions that, when executed by a processor, cause the processor to:
      receive, over a radio access network, an indication that a first user device and a second user device are to communicate;
      obtain session setup information for a communication session, via a local network that is different from the radio access network, between the first user device and the second user device,
         the session setup information identifying a security protocol for the communication session;
      determine, based on the session setup information, the second user device is capable of communicating, via the local network, using the security protocol;
      determine that the second user device is capable of participating in the communication session with the first user device via the local network based on determining that the second user device is capable of communicating, via the local network, using the security protocol; and
      transmit, over the radio access network and to the first user device and the second user device, session management information that permits the first user device and the second user device to establish the communication session via the local network.

16. The non-transitory computer-readable medium of claim 15, where the session setup information further identifies at least one of:
   a distance between the first user device and the second user device;
   a communication range for the communication session;
   a bandwidth for the communication session; or
   a quality of service level for the communication session.

17. The non-transitory computer-readable medium of claim 15, where the session management information identifies a security key that permits the first user device and the second user device to establish the communication session via the local network.

18. The non-transitory computer-readable medium of claim 17, where the security key identifies at least one of:
   a duration for the communication session;
   a data rate for the communication session; or
   the security protocol for the communication session.

19. The non-transitory computer-readable medium of claim 15, where the one or more instructions, that cause the processor to determine that the second user device is capable of participating in the communication session, cause the processor to:
   determine that the first user device is within a particular communication range of the second user device,
      the particular communication range being based on a type of the local network, and
   determine that the second user device is capable of participating in the communication session with the first user device via the local network based on determining that the second user device is capable of communicating, via the local network type, using the security protocol and based on determining that the first user device is within the particular communication range of the second user device.

20. The non-transitory computer-readable medium of claim 15, where the session setup information further identifies a local network type of the local network.

* * * * *